United States Patent
Wen et al.

[11] 3,776,489
[45] Dec. 4, 1973

[54] SONIC BOOM ELIMINATOR

[76] Inventors: Lian-Tong Wen, 601 W. 112th St., No. 7-C, New York, N.Y. 10025; Myron Gould Beard, 6 Martin Pl., Manhasset, N.Y. 11030

[22] Filed: Jan. 7, 1972

[21] Appl. No.: 216,127

Related U.S. Application Data

[63] Continuation of Ser. No. 880,336, Nov. 26, 1969, abandoned.

[52] U.S. Cl. ............ 244/1 N, 244/42 C, 244/130 R
[51] Int. Cl. ............................................. B64c 21/02
[58] Field of Search ............................. 244/1 N, 42

[56] References Cited
UNITED STATES PATENTS

| | | | |
|---|---|---|---|
| 2,169,325 | 8/1939 | Novak | 244/42 C |
| 2,507,611 | 5/1950 | Pappas et al. | 244/42 C |
| 3,441,236 | 4/1969 | Arnholdt | 244/42 C |

*Primary Examiner*—Milton Buchler
*Assistant Examiner*—Jesus D. Sotelo
*Attorney*—Elmer R. Helferich et al.

[57] ABSTRACT

A structure for eliminating sonic booms developed by the major sub-structures of a supersonic aircraft in accordance with the selective positioning of the exhaust gases of the aircraft, air inlets and outlets and conduits between the inlets and outlets. A supersonic aircraft using the structure is disclosed wherein the major sub-structures of the aircraft incorporate exhaust gas positioning, inlets, outlets and conduits between the inlets and outlets.

6 Claims, 7 Drawing Figures

PATENTED DEC 4 1973 3,776,489

INVENTORS

M. GOULD BEARD

Lian-Tong Nen

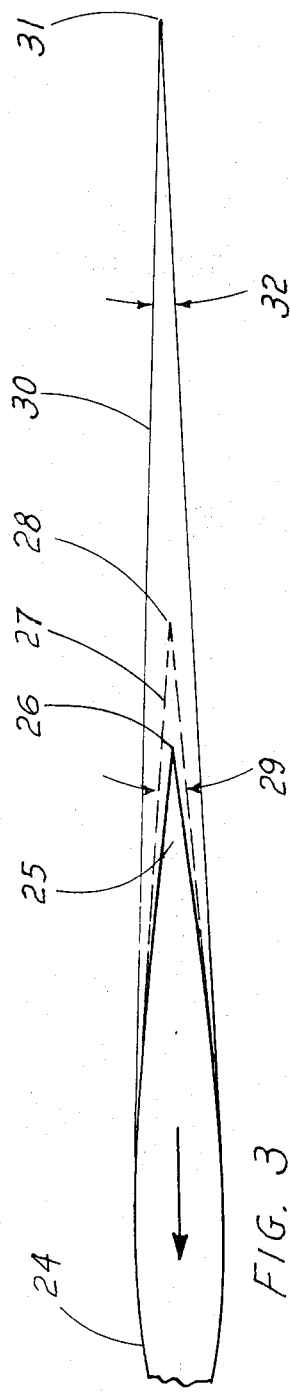
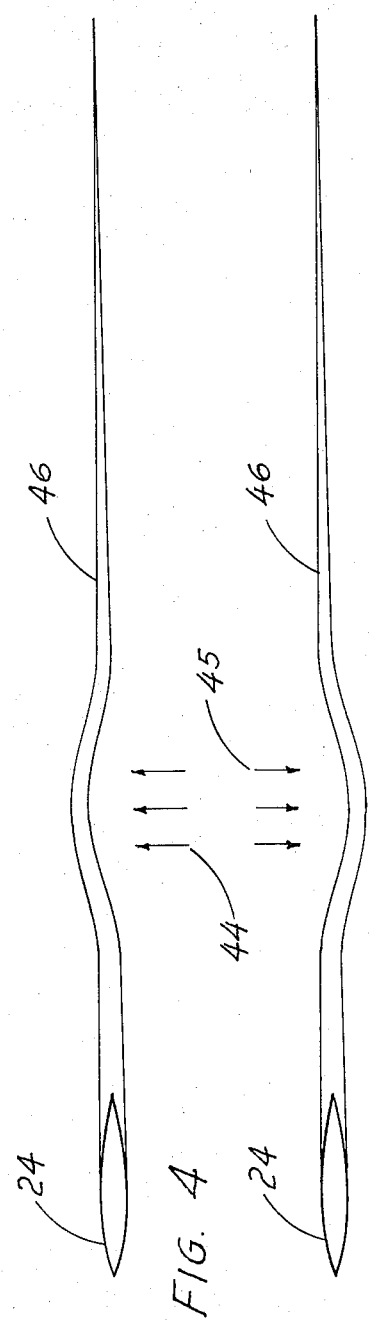
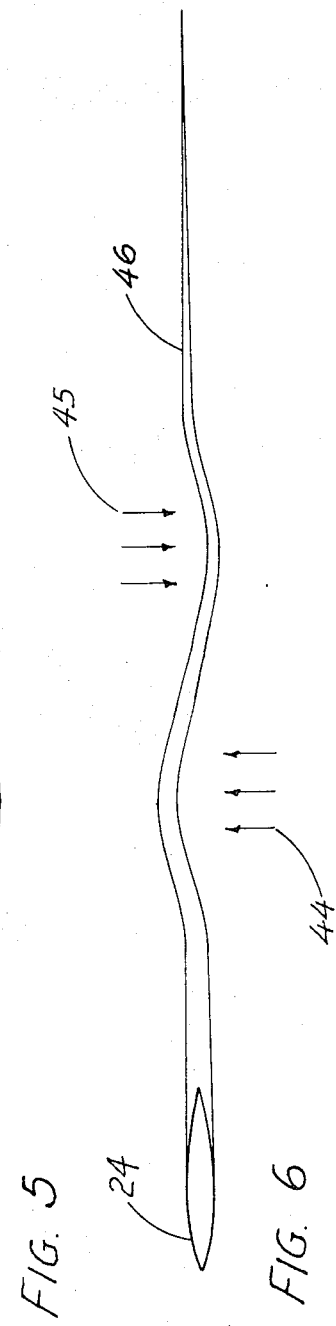
FIG. 3  FIG. 4  FIG. 5  FIG. 6

SONIC BOOM ELIMINATOR

This application is a continuation application of pending application Ser. No. 880,336, filed Nov. 26, 1969, now abandoned.

FIELD OF THE INVENTION

This invention relates generally to structure for eliminating sonic booms developed or generated by supersonic aircraft and more particularly to supersonic aircraft structures incorporating this structure in one or more of their major outer substructures. These outer substructures include the fuselage, wings and the horizontal and vertical stabilizers.

THE PHENOMENON OF SONIC BOOMS

It is appropriate to first describe the phenomenon of the sonic boom before the solution of its problem. It will be easier to comprehend the basic idea of this invention when its behavior is clearly explained.

A loud burst of sound produced by an aircraft flying over the speed of sound is known as a sonic boom.

There are at least three kinds of booms produced by sonic or supersonic speed aircraft, which are heard at ground level and familiarly called sonic booms.

The first delineation of sonic boom occurs when an aircraft is speeding at sonic speed and passing overhead. The sound is heard as a sonic boom.

The second delineation of sonic boom occurs when an aircraft is speeding at more than sonic speed and pulls up or changes direction. This activity will also produce a sonic boom.

The third delineation of sonic boom occurs when an aircraft is speeding at much faster than sonic speed. The aircraft produces an erratic or unpredictable sonic boom which will be explained in detail below.

The first delineation is different from the other two. It is only the roar of sounds generated by the aircraft. These sounds are piled up at the speed of sound and reach ground level at the same moment. Sound radiates in all directions at the speed of sound. But when an aircraft is flying at the speed of sound, the portion of sound on the aircraft's path cannot radiate faster than the aircraft. It will be traveling at the speed of sound with the aircraft. As more and more sounds are generated, they pile up into a big roar. In fact, it is proper if the name sonic boom is given to this piled up sonic roar.

The second boom is not produced at sonic speed. It is produced usually at over sonic speed. Sound waves do not pile up at that speed. This boom is usually heard when the aircraft pulls up or makes a turn. It does not occur from crossing the sonic barrier. This boom can usually be controlled by avoiding a turn.

The third boom is the same as the second in that it happens only at speeds higher than the speed of sound. But it is not produced from making a turn or any maneuver. It is erratic and uncontrollable. This is the kind of boom that has concerned the aircraft industries for many years.

The second and third type of booms are produced by the closing of a vacuum, in the same manner that thunder is produced by the closing of the vacuum generated by lightning.

The word vacuum in this case is not literally correct. Scientifically it is not a vacuum because there are air molecules, gas particles, etc. in the air pocket. This air pocket is an empty space enclosed by boundary air layers (or air walls) which are rushing inward to close up the vacuum or the pocket.

On a minor scale, these two sonic booms are analogous to the "cheep" produced by a high voltage electric discharge in the laboratory. Similarly, the crack of a whip is produced by the closing of vacuum gouged out by the sonic or supersonic speed of the tip of the whip.

It is well known that much speed is not required to produce a vacuum within a heavier fluid such as water. Eventually, with proportionally higher speed a vacuum can also be produced in a lighter fluid, e.g., air.

When an airfoil is speeding in the air at faster than the speed of sound, a vacuum will be produced. This vacuum will be trailing behind the trailing edge of the airfoil in the form of a wedge. This vacuum wedge will become longer when the airfoil goes faster. When the airfoil slows down, this vacuum wedge becomes shorter and eventually disappears when the speed is below sound speed. The speed at which the vacuum starts to form or starts to disappear may be called the "critical vacuum speed". It happens to be near the speed of sound for an average airfoil.

The fluttering or shocks felt on the controls (i.e., ailerons, etc.) of a supersonic aircraft is critical vacuum speed, is due to the uneven atmospheric pressure along the path of the flight. At this critical vacuum speed, a slight change in atmospheric pressure will cause the boundary air layers to close up or open up the vacuum. When an aircraft remains too long at its critical vacuum speed, the opening (or closing) of the boundary air layers against the trailing edges, may damage the aircraft because the hugging (or closing) of the boundary air layer on the trailing edge usually takes place with a violent slap. Therefore, the crossing of the critical vacuum speed must be fast, that is, going either from subsonic to supersonic or from supersonic to subsonic speed, to minimize the shock.

The critical vacuum speed is different for every airfoil or trailing edge. It depends on the steepness of the surface towards the trailing edge. The greater the angle, the slower would be its critical vacuum speed and vice versa. (At one extreme, that is, when the trailing edge angle is too steep, the critical vacuum speed will occur in the subsonic region.) Also, the higher the atmospheric pressure the faster will be the critical vacuum speed.

In short, when an aircraft is speeding at over the critical vacuum speed, the boundary air layers can no longer hug the trailing edge and form a wedge-like vacuum trailing behind the trailing edge. In the case of the trailing edge of a fuselage, the vacuum will be formed by the boundary air layer around the trailing edge. This boundary air layer encloses the vacuum to form a conical shape vacuum, trailing behind the trailing edge. All vacuums become longer as the aircraft speed increases. When the speed is reduced, the vacuum becomes shorter and finally closes up (i.e., the hug or slap) on the trailing edge to give a shock to the aircraft.

A sonic boom is developed by the pulling up of a supersonic aircraft. In other words, it is developed by the pulling up of a speeding aircraft which has a considerable length of vacuum wedge or cone trailing behind the trailing edge. When the aircraft pulls up, a portion of the long vacuum wedge could be cut off. This cut off portion will be left behind and it will close up independently, by air pressure, to produce a clapping sound which is the sonic boom.

It must be noted, however, that the vacuum wedge will increase in length with the increase of time at which the aircraft is at its supersonic speed. Because the boundary air layers are closing up, the vacuum at critical vacuum speed (slower than the airfoil) is dropping behind with the increase of time. But there is a limit to such growth in length because the longer the vacuum wedge becomes, the smaller the tip angle of the wedge will become and the faster the forward speed of the wedge tip will become in attempting to catch up and equal the speed of the airfoil. This increase in length of the vacuum wedge is the reason that a mere over critical vacuum speed will generate a vacuum wedge long enough to produce a boom.

The intensity or volume of the boom depends upon the size of the vacuum that causes it. It is therefore proportional to the size and weight of the plane. For example, the magnitude of a sonic boom generated by a supersonic transport (SST) could be substantial.

This boom (second delineation) normally can be avoided by avoiding a turn. However, the third delineation is not controllable. It is even worse in that it is not predictable. To distinguish the third boom from the second, let the third be called a supersonic boom and the second be called a sonic boom.

When the high supersonic aircraft produces a long vacuum wedge, a portion of it can be cut off without making any turn. The vacuum wedge will be longer and can be cut off more easily, to produce a boom when the aircraft travels faster.

The bumpiness felt in a conventional aircraft is caused by air turbulence. A sharp distinct up drift will make it feel like a car is bumping on a ridge. A similar down drift will produce the same result but is felt differently. A side drift will also cause the plane to jerk to one side but with less intensity. When these up and down drifts are on the path of a high supersonic plane, they will cause supersonic booms. These booms cannot be controlled because the air turbulence on the flight path cannot be controlled.

The disclosed invention will not be able to silence the boom after it is generated, but it will be able to prevent it from being generated. Since a sonic boom is generated by a vacuum and originated at a trailing edge, if one can avoid the formation of the vacuum at the trailing edge, once can avoid the boom. Since one cannot, in a simple way, avoid the formation of the vacuum, destruction or spoiling its formation could be simpler.

Although a missile is much faster than a supersonic aircraft, it produces no boom. It will not produce the second type of boom because it does not make turns as an aircraft does. But it should develop the third type boom (supersonic boom). However, a missile, with its propulsion rocket at its tail, cannot develop a vacuum at its tail because the rocket exhaust gas has spoiled or filled up the vacuum. Nevertheless, it may be possible for a missile to produce a supersonic boom when the rocket engine is completely burned up and is speeding or coasting at a high supersonic speed over a turbulent path. The booms heard as Apollo 10 approached for splashdown were of this nature. Therefore, the direction of an engine exhaust into the vacuum as in the case of the missile, can be a simple way to spoil the formation of a vacuum. The introduction of a stream of air or gas into the location where the vacuum is forming, is another simple way to spoil the vacuum.

Almost all trailing edges of a supersonic aircraft will develop a vacuum and booms may be generated from them. Among all the trailing edges of a plane which develop a vacuum, the largest trailing edge is that of the fuselage. It is important that this large trailing edge be designed in order to avoid the biggest boom developed by aircraft.

The introduction of air or gas into the vacuum at a proper location may also eliminate the shock while crossing the critical vacuum speed. With such a provision, the supersonic aircraft may cross the critical vacuum speed (or the so-called sonic barrier) without emanating a shock or flutter.

The quantity of exhaust gas or air needed to spoil a vacuum, is still to be determined by experiment. However, the greater the quantity of gas or air used the better would be the result. For practicality and economy, the least amount of gas or air should be used.

When air or gas is introduced into a long vacuum, the vacuum becomes a partial vacuum, which will be more difficult to cut off. This is because the air introduced into the vacuum will produce some resistance to the closing boundary air layers (or air walls) which try to cut off the vacuum. If this partial vacuum is cut off, the closing of the air walls will not be colliding into each other to produce the usual boom, but just to compress this new formation of thin air. A thud may be heard instead of a boom.

OBJECTS OF THE INVENTION

The present invention relates to the solution of the sonic boom generated by a supersonic or hypersonic speed aircraft.

The invention provides the aircraft with devices and means to minimize or eliminate the sonic boom.

This invention further provides devices to minimize or eliminate shocks or fluttering when crossing the sonic barrier.

This invention also provides the configuration of a supersonic aircraft which will minimize or eliminate the sonic boom.

Other objects of this invention will in part be obvious as they appear hereinafter.

BRIEF DESCRIPTION OF THE DRAWINGS

For fuller understanding of the method and procedures by which the objects of this invention are achieved, reference should be made to the following description taken connection with the accompanying drawings in which:

FIG. 3 illustrates a trailing edge of a supersonic aircraft with its vacuum wedge trailing behind it.

FIG. 4, 5 and 6 illustrate an extra long vacuum wedge and the bending effects on said wedge due to air drifts.

In FIG. 1, 1 is the fuselage of the aircraft. 2 is the air entrance or intake of an engine inside the fuselage. 3 is the wing. 4 is the leading edge of the wing. 5s are the openings or slots near the trailing edge of the wing. 6 is the aileron. 7 is the exhaust end of an engine. 8 is the leading edge of the horizontal stabilizer. 9 is the horizontal stabilizer. 10 is an opening or slot on 9 resembling 5. 11 is the elevator. 12 is the engine exhaust at the trailing end of the fuselage. 13s are the entrances or openings at the leading edge to let in or scoop in the ram air on the leading edge, they may be slots or openings of any kind. 14s are sections of air channels behind the leading edge. As shown, there are three separate sections on each wing. 15s are conduits or channels joining channel 14 to slot 5. 16 is the air entrance or opening on the leading edge of the stabilizer resembling opening 13. 17 is the air channel along the leading edge of the stabilizer similar to channel 14.

In FIG. 1, the airplane is symmetrical right and left with respect to the centerline. In order to avoid confusion, the details are shown on only one side.

In FIG. 2, 18 is the entrance or opening on the leading edge of the vertical stabilizer 20. 19 is the leading edge of the vertical stabilizer. 21 is the leading edge air channel resembling channel 17. 22 is the opening or slot on 20 resembling slot 10. And 23 is the rudder of the aircraft.

In FIG. 3, 24 is an airfoil. 25 is the trailing edge of the airfoil. 26 is the tip of the airfoil. 27 (dash outlined wedge) is a short vacuum wedge. 28 is the tip of the short vacuum wedge. 29 is the angle of short vacuum wedge. 30 is a long vacuum wedge. 31 is the tip of the long vacuum wedge. And 32 is the angle of the long vacuum wedge.

In FIG. 4, 44 is upwardly drifting air. 46 is the extra long vacuum wedge produced by a high supersonic speed aircraft.

In FIG. 5, 45 is downwardly drifting air.

In FIG. 6, the extra long vacuum wedge 46 is shown encountering up and down drifts 44 and 45.

In FIG. 7, 33s are the direction and force of the advance of air surfaces or air walls (or boundary air layers) 39 and 40 of the vacuum wedge 30. Air walls 39 and 40 are directed towards the middle of vacuums 35 and 41. Similarly, 34s (in dotted lines) are the direction and force of the advance of air walls 36 and 37 (in dotted lines) towards the middle of the vacuum wedge 30. 42s are angles (1) between air wall 39 and 33 and (2) also between 40 and 33. Similarly, 43s are angles (1) between air wall 36 and 34 and (2) also between 37 and 34. 38 is the point at which vacuum 41 is cut off from vacuum 35.

EMBODIMENTS

Figure 1:
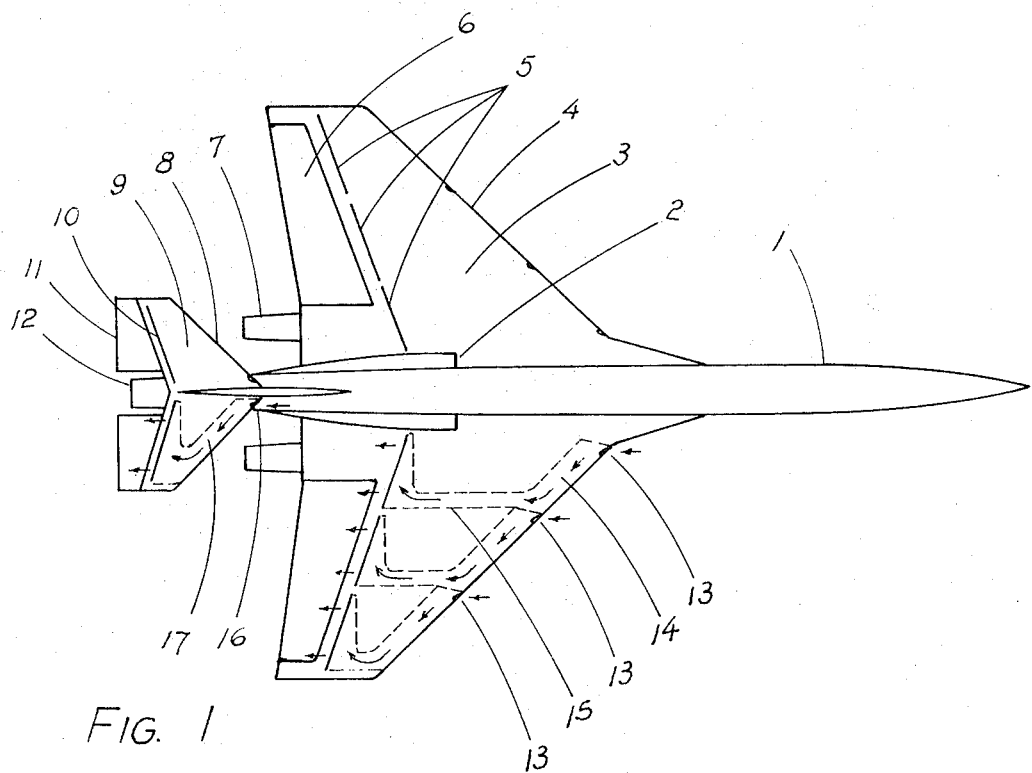
FIG. 1 is the plan view of a supersonic aircraft, showing a preferred configuration and installations to achieve the objects of this invention.

FIG. 3 illustrates how a supersonic airfoil generates its long vacuum wedge. When the airfoil 24 is speeding from subsonic to supersonic speed, at the moment the boundary air layers (on the top and the bottom of the airfoil) can no longer hug the trailing edge surfaces, the boundary air layers fall behind to produce a vacuum as indicated by 27. Vacuum 27 will grow longer with the increase in time at which the airfoil remains at its supersonic speed. This phenomenon will occur even if this speed remains constant. The extension of vacuum 27 will occur because tip 26 is moving faster than tip 28. The length of the vacuum is increasing by the difference of these tip speeds (tips 26 and 28) multiplied by time. However, the increase in length will reach a limit. This is true because as the vacuum wedge 30 increases in length its tip angle 32 is decreasing. The forward speed of the wedge tip 31 increases as angle 32 decreases. The limit of length will be reached when the tip speed of 31 is equal to the tip speed of 26.

The above reasoning shows that an aircraft speed of slightly over critical vacuum speed will produce a vacuum wedge long enough to be broken or cut off.

Figure 7:
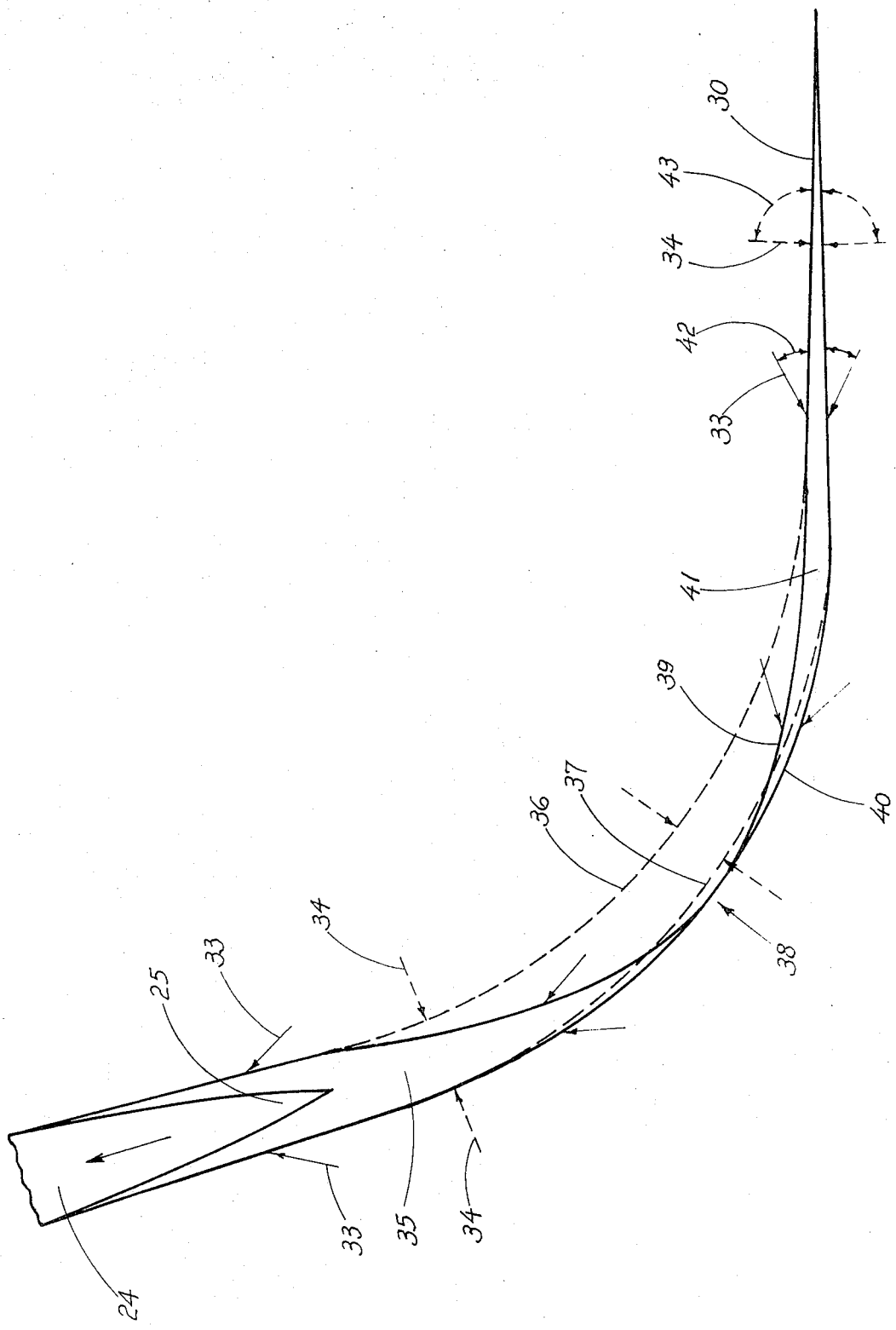
FIG. 7 illustrates a long vacuum wedge being cut off by a sharp turn or maneuver.

FIG. 7 illustrates a vacuum wedge being broken or cut off, when a supersonic aircraft pulls up or makes a turn.

It is generally thought that when a supersonic aircraft pulls up, the long vacuum wedge, as illustrated in FIG. 3, will be curving behind the trailing edge, as shown in the dotted lines 36 and 37 in FIG. 7. This would be the case if 36 and 37 are closing up in the vacuum wedge at a normal direction, that is, if angle 43 is 90°. But, in actuality, the closing of the air walls toward the vacuum wedge is not 90°. It is much less, as shown by angle 42. The air walls, with their boundary air layers closely in contact with the surfaces of the airfoil, are induced to move forward at a certain speed. This forward speed causes the perpendicularly moving 34s to move in a resultant direction as shown by 33s. Angle 33s are less than 90°.

As the aircraft pulls up, the shape of the vacuum wedge will not follow the dotted lines (36 and 37) but become distorted, as shown by the solid lines 39 and 40. At the turn, the forward motion of the resultant is added to the force of inertia, which resists the change of direction, to make the vacuum wedge even more forceful in its forward direction. The upper air wall 39 advancing (or digging) into the vacuum without resistance distorts the shape of the vacuum wedge. At the same time, the lower wall 40, though advancing with the same force, is pushing against a wall of air, causing it (40) to remain almost in the same shape as the dotted line 37. Because of the difference in their movements, it is possible for the two air walls 39 and 40 to meet at the bend 38 sooner than if the aircraft were in normal flight and to cut off the vacuum wedge behind the bend. The cut off vacuum wedge 41 will be left behind and is closed up by the air walls 39 and 40 to produce a sonic boom.

FIGS. 4, 5 and 6 illustrate how an extra long supersonic vacuum wedge produced by a high supersonic aircraft is bent by the up and/or down drifts of air turbulence. The bending of the vacuum wedge in this manner will cause the vacuum to break off in the same manner as if the aircraft is pulling up or making a turn as described in previous paragraphs.

As illustrated in FIG. 6, a double bend may produce more than one boom.

This type of boom caused by air turbulence cannot be avoided in the same manner as the second type of boom, i.e., by avoiding certain aircraft maneuvers. One cannot avoid air turbulence on the flight path. This type of boom is inconsistent and not predictable. It is this boom for which a design is needed.

As already described, the simplest way to eliminate the sonic boom is to spoil the vacuum generated by the aircraft. The following is a description of a preferred means to spoil the vacuum.

Since sonic booms are produced separately by the fuselage, wings, control surfaces, etc., they should be taken care of separately.

Figure 2:
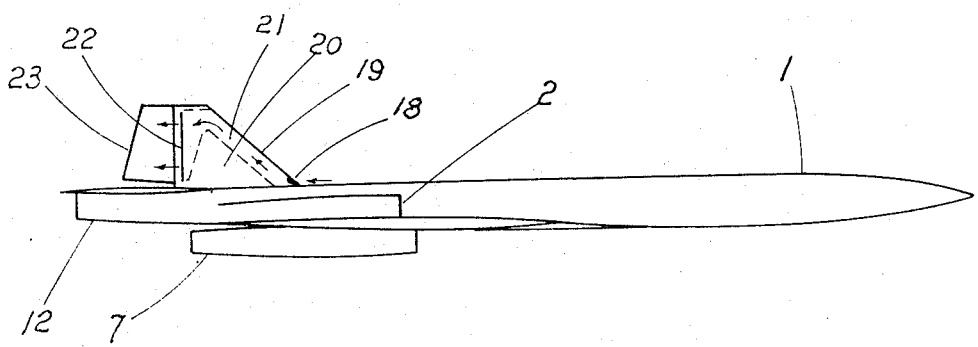
FIG. 2 is a side view of a supersonic aircraft.

FIGS. 1 and 2 illustrate the devices needed to reduce or eliminate the sonic boom in a supersonic aircraft. It is preferred that the largest vacuum which will generate the loudest boom, that is, the vacuum produced by the fuselage, be filled or spoiled by the exhaust gas of the engine or engines. As shown, there are two concealed engines with their exhausts forming the fuselage end 12. The exhaust gas of these engines will be filling or spoiling this largest vacuum to eliminate any potential booms that, otherwise, would have been produced by the fuselage.

Exhaust 12 is a combined exhaust of two engines, but it may be so designed that each engine is exhausting separately. These exhausts may be positioned side by side or up and down, resembling a double barreled shotgun. When a concealed engine is not desired in an aircraft design, the engine (or engines) may be located around and close to the fuselage with its (or their) exhaust gas jetting parallel to the fuselage and towards the vacuum.

Of course, this large vacuum may also be spoiled by scooped in air if the configuration of the aircraft favors such arrangement.

As already described, the greater the quantity of gas or air used to fill the vacuum, the better the gas or air will spoil the vacuum. For practicality, the least amount of gas or air is favored.

The vacuums produced by the wings are quite large in size, being second only to the vacuum developed by the fuselage. The preferred way to spoil these vacuums is illustrated in FIG. 1 and 2. The air inlets, either singularly or in combination, scoop or let air into the wing at the leading edge and conduit means are connected to slot means which exhaust or let air out at or near the trailing edge, to fill the developed vacuums. As shown, the hot and compressed ram air at the leading edge 4 is scooped or let in through opening 13. This hot and compressed ram air is first expanded in channel 14 to cool the leading edge 4 (reference should be made to U.S. Pat. No. 3,470,703). The air then flows through conduit 15, to be exhausted into the vacuum through slot 5 to spoil said vacuum. As shown, there are three sets of air inlets and exhausts on each wing, but there may be more or less according to the aircraft's requirements.

The exhaust gas of engines may also be used to spoil or fill the vacuum wedge produced by the wings, when multiple engines are located on the wings. In this case, a multiple of smaller engines is preferred.

The jetting exhaust gas from the engine, as opposed to the air or gas from the aircraft, reacts quite differently in the vacuum trailing the aircraft. When air or gas is let out into the vacuum wedge, it has almost the same speed in the vacuum following the aircraft, as that of the aircraft. At the moment of release, it expands and spreads to fill the vacuum as fast as it can. While engine exhaust gas is jetting away from the aircraft at a very high speed, it hardly expands during the short period in the vacuum wedge. Therefore, the closer the engines are to each other the better it would be for the purpose of spoiling the vacuum. A multiple of smaller engines will spread to cover a wider vacuum than a few larger engines.

The horizontal stabilizers 9 are analogous to a small wing. In FIG. 1 and 2, they are shown with only one air entrance 16 and one outlet slot 10 on each side, but there may be more air entrances, conduits and slots, resembling those on the wing, if they are needed. The air entrances, conduits and slots function in a manner similar to an analogous structure on a wing. The hot and compressed ram air is scooped or let in through 16, expanded in channel 17 to cool the leading edge 8, and exhausted through 10 into the rear of the horizontal stabilizer to fill or spoil the vacuum created by the presence of said stabilizer.

The vertical stabilizer 20 resembles the horizontal stabilizer 9 and functions similarly. Air enters 18, is expanded in 21 and exhausted through slot 22 into the vacuum wedge developed by the vertical stabilizer.

If leading edge cooling is not needed, the air is scooped or let in through 13, 16 and 18 and may be ducted directly to slots 5, 10 and 22, respectively, for the same result.

Centralization of ram air-intake to replace inlets 13, 16 and 18 may also be devised when such arrangement is favored. The air scooped or let into the aircraft from the centrallized opening may then be directed to different outlets with conduits.

Outlets 5, 10 and 22 may be provided, as shown, on the top surfaces. They may be designed on the lower surfaces or even on both the top and lower surfaces, according to the aircraft's need. These slots may be varied in their locations from where the vacuum starts to the trailing edge, to suit the requirement and design of the aircraft.

Outlet slots 5, 10 and 22 as well as inlet openings 13, 16 and 18 may be designed so that they can be closed or opened during flight. It may be better to close these openings at subsonic speed.

Through the entire process of boom elimination, no excess power is needed. The pressure at the front of the aircraft and the vacuums developed at the rear of the aircraft are fully utilized.

The simplicity of this invention, having almost no moving parts and being light in weight, is ideal for today's weight conscious supersonic aircraft designers and high maintenance costs.

The configuration of the aircraft shown is only a preferred example to illustrate how the devices can be installed and to clearly demonstrate and describe how they will function. It is understood that any changes or deviations on each part shown may be made without departing from the spirit of this invention. Further, where specific terminology is utilized or specific devices are mentioned, it is understood that the invention is not restricted to such terms or devices, but that all useful equivalents of such terms and devices suitable for the purpose of this invention are intended or included thereby.

The invention that is claimed is:

1. In an aircraft adapted to fly at supersonic speeds without attendant generation of sonic booms, an airfoil having a leading edge and a trailing edge, air intake means disposed in the surface of said leading edge defined by apertures therein of small area relative to the area of said leading edge surface, air exhaust means disposed in said trailing edge and conduit means interconnecting said intake and exhaust means, said conduit means providing substantially free communication between said intake and exhaust means, said conduit means having a cross-sectional expanse adjacent said exhaust means substantially greater than the cross-sectional expanse of the apertures communicating with said conduit means for conducting air from said conduit to said exhaust means sufficient only to fill the vacuum adjacent said trailing edge in supersonic flight of said aircraft with said conduit means conducted air.

2. In an aircraft adapted to fly at supersonic speeds without attendant generation of sonic booms, in combination, air intake means in the surface of a leading edge of said aircraft defined by at least an aperture therein of small area relative to the area of said leading edge surface, air exhaust means disposed in the trailing edges of major substructures of said aircraft and conduit means interconnecting said intake and exhaust means, said conduit means providing substantially free communication between said intake and exhaust means, said conduit means having a cross-sectional expanse adjacent said exhaust means substantially greater than the cross-sectional expanse of the apertures communicating with said conduit means for conducting air from said conduit to said exhaust means sufficient only to fill the vacuum adjacent said trailing edge in supersonic flight of said aircraft with said conduit means conducted air.

3. The invention claimed in claim 1 wherein said airfoil is a wing of said aircraft.

4. The invention claimed in claim 1 wherein said airfoil is a stabilizer of said aircraft.

5. The invention claimed in claim 2 wherein said major substructures are wings of said aircraft.

6. The invention claimed in claim 2 wherein said major substructures are stabilizers of said aircraft.

* * * * *